(12) United States Patent
Alger et al.

(10) Patent No.: US 11,228,445 B2
(45) Date of Patent: Jan. 18, 2022

(54) FILE VALIDATION USING A BLOCKCHAIN

(71) Applicant: DocuSign, Inc., San Francisco, CA (US)

(72) Inventors: Gregory J. Alger, Renton, WA (US); Duane R. Wald, Kent, WA (US); Andrew Mintner, Seattle, WA (US); Donald Grant Peterson, Lake Forest Park, WA (US); Taiga Matsumoto, Seattle, WA (US); Damon Dean, San Francisco, CA (US); Drew Ashlock, San Francisco, CA (US)

(73) Assignee: DocuSign, Inc., San Francisco, CA (US)

(*) Notice: Subject to any disclaimer, the term of this patent is extended or adjusted under 35 U.S.C. 154(b) by 245 days.

(21) Appl. No.: 16/442,283

(22) Filed: Jun. 14, 2019

(65) Prior Publication Data

US 2019/0386833 A1    Dec. 19, 2019

Related U.S. Application Data

(60) Provisional application No. 62/687,160, filed on Jun. 19, 2018.

(51) Int. Cl.
| | |
|---|---|
| H04L 9/32 | (2006.01) |
| H04L 9/06 | (2006.01) |
| G06F 7/36 | (2006.01) |
| G06F 7/24 | (2006.01) |

(52) U.S. Cl.
CPC .............. H04L 9/3247 (2013.01); G06F 7/24 (2013.01); G06F 7/36 (2013.01); H04L 9/0643 (2013.01); H04L 2209/38 (2013.01)

(58) Field of Classification Search
CPC ......... G06F 7/24; G06F 7/36; H04L 2209/38; H04L 9/3247; H04L 9/0643; H04L 9/3236
USPC ........................................................ 713/176
See application file for complete search history.

(56) References Cited

U.S. PATENT DOCUMENTS

| | | | |
|---|---|---|---|
| 7,434,058 B2 | 10/2008 | Ahuja et al. | |
| 8,078,878 B2 | 12/2011 | Dietl | |
| 10,419,209 B1* | 9/2019 | Griffin | H04L 9/3247 |
| 10,713,727 B1* | 7/2020 | Floyd | G07C 5/085 |
| 2003/0120647 A1* | 6/2003 | Aiken | G06F 16/951 |
| 2006/0168650 A1* | 7/2006 | Kumagai | H04L 9/3263 726/5 |
| 2008/0256362 A1* | 10/2008 | Takenaka | H04L 9/3236 713/180 |

(Continued)

FOREIGN PATENT DOCUMENTS

| | | | | |
|---|---|---|---|---|
| WO | WO 2017/143435 A1 | 8/2017 | | |
| WO | WO-2017143435 A1 * | 8/2017 | ........... | H04L 9/0825 |

OTHER PUBLICATIONS

PCT International Search Report and Written Opinion, PCT Application No. PCT/US2019/037348, dated Aug. 28, 2019, 11 pages.

*Primary Examiner* — Kambiz Zand
*Assistant Examiner* — Mahabub S Ahmed
(74) *Attorney, Agent, or Firm* — Fenwick & West LLP

(57) ABSTRACT

Disclosed are various embodiments for validating documents using a blockchain data. Multiple documents can be included in the validation process using a merge and hash process and a summary terms document. Validation can be performed by hashing and merging operations, followed by comparing hash values.

19 Claims, 10 Drawing Sheets

(56) References Cited

U.S. PATENT DOCUMENTS

| | | | |
|---|---|---|---|
| 2010/0111292 A1* | 5/2010 | Betouin | H04L 9/0643 |
| | | | 380/28 |
| 2015/0295720 A1* | 10/2015 | Buldas | H04L 9/3263 |
| | | | 713/176 |
| 2016/0197903 A1* | 7/2016 | Dease | H04L 63/08 |
| | | | 726/5 |
| 2016/0283920 A1* | 9/2016 | Fisher | H04L 9/3297 |
| 2016/0292680 A1* | 10/2016 | Wilson, Jr. | G06Q 20/40 |
| 2017/0011460 A1 | 1/2017 | Molinari et al. | |
| 2017/0033933 A1* | 2/2017 | Haber | G06F 21/64 |
| 2017/0041148 A1* | 2/2017 | Pearce | H04L 9/3236 |
| 2017/0126702 A1* | 5/2017 | Krishnamurthy | H04L 63/123 |
| 2017/0141924 A1* | 5/2017 | Ryu | H04L 9/3236 |
| 2017/0272250 A1* | 9/2017 | Kaliski, Jr. | H04L 9/3265 |
| 2017/0295180 A1* | 10/2017 | Day | H04L 9/0836 |
| 2017/0359374 A1* | 12/2017 | Smith | G06F 21/6245 |
| 2018/0189312 A1* | 7/2018 | Alas | G06F 21/64 |
| 2018/0205552 A1* | 7/2018 | Struttmann | H04L 9/3242 |
| 2018/0219685 A1 | 8/2018 | Deery et al. | |
| 2019/0058599 A1* | 2/2019 | Takada Chino | H04L 9/302 |
| 2019/0171849 A1* | 6/2019 | Assenmacher | G06F 21/64 |
| 2019/0207766 A1* | 7/2019 | Sanghvi | H04L 63/123 |
| 2020/0250676 A1* | 8/2020 | Sierra | H04L 9/302 |
| 2020/0363994 A1* | 11/2020 | Jing | H04L 9/3236 |
| 2021/0211299 A1* | 7/2021 | Hussain | H04L 9/3297 |

* cited by examiner

FILE VALIDATION USING A BLOCKCHAIN

CHAIN OF PRIORITY

This application claims the benefit of priority to U.S. Patent Application Ser. No. 62/687,160, filed on Jun. 19, 2018, which is incorporated herein by reference in its entirety.

TECHNICAL FIELD

The present disclosure generally relates to machines configured to the technical field of special-purpose machines that perform file processing and improvements to such variants, and to the technologies by which such special-purpose machines become improved compared to other special-purpose machines for processing files using a blockchain.

BACKGROUND

Documents can be electronically signed by typing a signing user's name in a signature field, scanning an image of a hand signed document, or using digital certificates. While electronically signed documents allow documents to be signed even though the signing users are not physically near one another, providing document authenticity is difficult. Users must trust the network service provider of the electronic signing service (e.g., website) and it is difficult to shift authentication services away from the network service provider due to the number of network events required to successfully electronically sign one or more documents between different users over a network. This problem is made worse because often multiple documents form the "four corners of an agreement", and the multiple documents may or may not reference one another, which can lead to ambiguity of which documents were actually part of the agreement at signing time.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
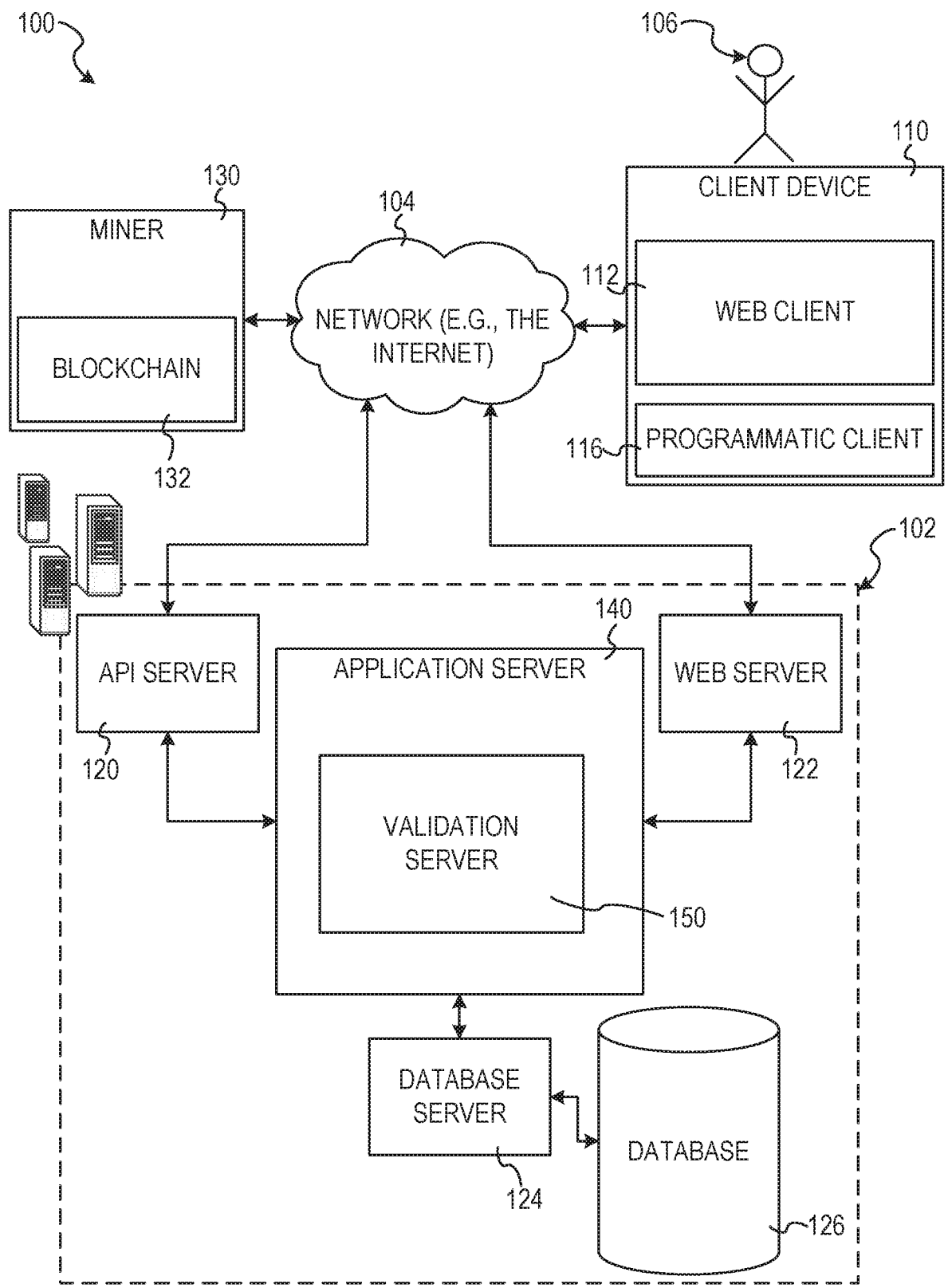
FIG. 1 is a block diagram illustrating a networked system, according to some example embodiments.

With reference to FIG. 1, an example embodiment of a high-level client-server-based network architecture 100 is shown. A networked system 102 provides server-side functionality via a network 104 (e.g., the Internet or wide area network (WAN)) to one or more user devices, such as client device 110. In some implementations, a user (e.g., user 106) interacts with the networked system 102 using the client device 110. FIG. 1 illustrates, for example, a web client 112 (e.g., a browser), and a programmatic client 116 executing on the client device 110. The client device 110 includes the web client 112, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultra-book, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps. In some implementations, the user access the application server 140 via the web client 112 to upload documents for signing, sign uploaded documents, or request validation of documents via a blockchain.

The web client 112 accesses the various systems of the networked system 102 via the web interface supported by a web server 122. Similarly, the programmatic client 116 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, an application server 140. The application server 140 can host a validation system 150, which can provide network services (e.g., signing, validation) to the client device 110, according to some example embodiments. The application server 140 is, in turn, shown to be coupled to a database server 124 that facilitates access to one or more information storage repositories, such as database 126. In an example embodiment, the database 126 comprises one or more storage devices that store information (e.g., unsigned electronic documents, signed electronic documents, directories or envelopes of document sets, user profile data of users such as user 106) to be accessed by validation system 150 or client device 110. Additionally, blockchain execution client 132, executing on miner 130, is shown as having programmatic access to the networked system 102 via the programmatic interface provided by the API server 120. For example, the miner 130 may utilize information retrieved from the networked system 102, supports one or more features or functions requested by the validation system 150

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 can also be implemented as standalone software programs, which do not necessarily have networking capabilities.

Figure 2:
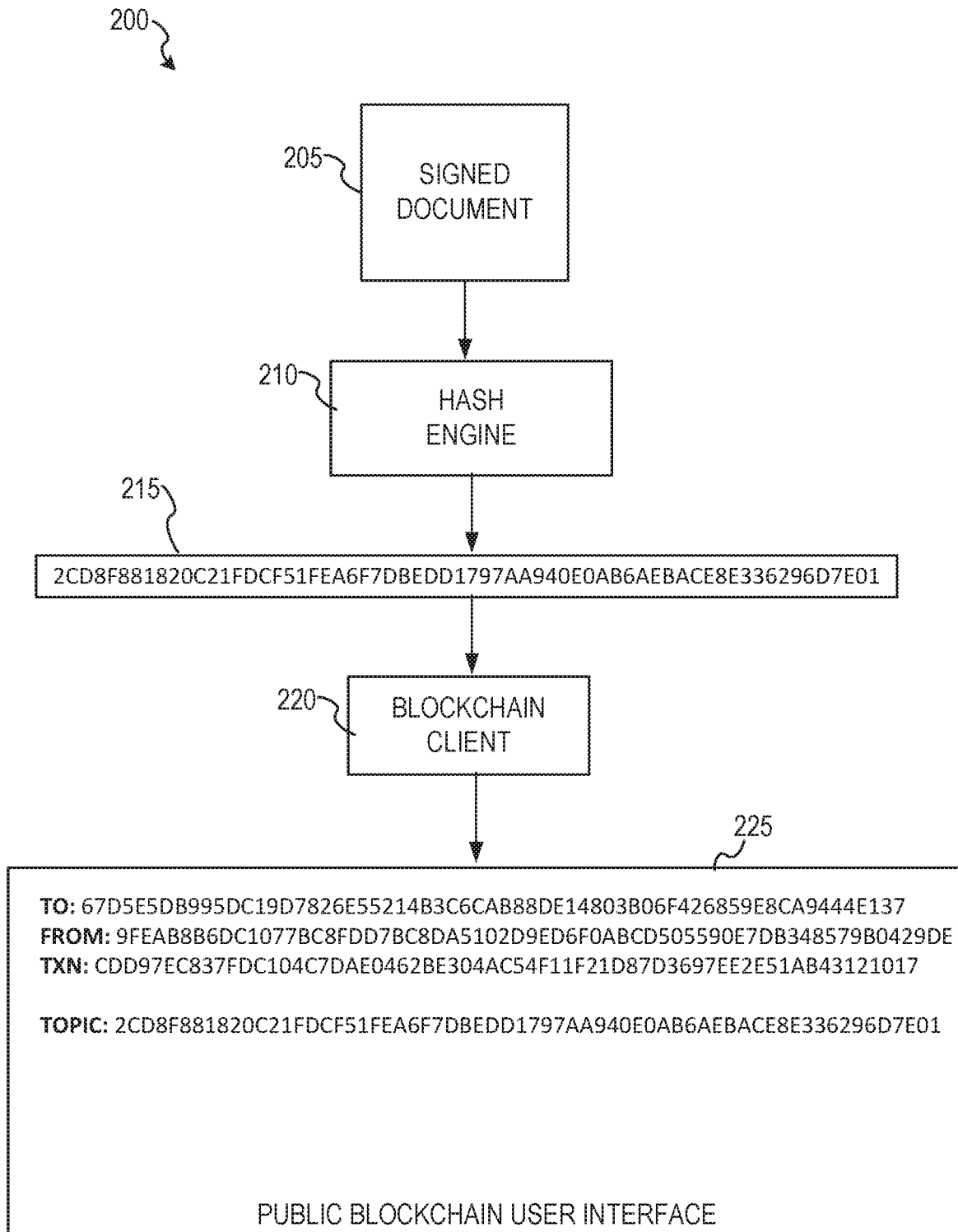
FIG. 2 shows an example dataflow for block-based file validation, according to some example embodiments.

FIG. 2 shows an example dataflow 200 for block-based file validation, according to some example embodiments. The signed document 205 is an electronic document, such as a PDF having terms of an agreement and one or more signing fields in which signing users can apply their signatures. In some example embodiments, the signing document 205 is signed using ink and then scanned to create an image file, which is then converted into a PDF file. In some example embodiments, the signed document 205 is a text file (e.g., rich text file, Microsoft Word file), in which electronic signatures can be applied by converting the text file into a PDF document and then signing it using a digital certificate key (e.g., generating a digital signature using a private key of user 106, wherein the digital signature can be validated as originating from the private key from a corresponding public key of the user)

The signed document 205 is input into a hashing engine 210. The hashing engine 210 may use a hashing scheme such as SHA256 to generate a signed document hash 215. The signed document hash 215 is unique to the signed document 205. No other document, if run through the hash engine 210, will result in the value of signed document hash 215. Further, if any data is changed in the signed document 205 (e.g., the file is renamed, one or more terms of an agreement are changed, an additional period is added anywhere in the file, additional overlay data is added to the file, and so on), the hash generated from the changed signed document will result in a different hash that is unlike hash 215 by one or more values.

The hash 215 is input into a blockchain client 220 (e.g., a customized blockchain software wallet) which is configured to access a public blockchain ledger (via miner 130), such as the Bitcoin blockchain or the Ethereum blockchain. The blockchain client 220 transmits the hash 215 to a blockchain entity that is on the publicly accessible blockchain. The transmission to the blockchain may include the hash 215 as payload data ("topic" data). For example, the blockchain client 220 can transmit the hash as payload data to a smart contract stored on the Ethereum blockchain. As an additional example, the blockchain client 220 can transmit the hash as metadata of a bitcoin transaction sent to another bitcoin user. The metadata can include the hash in header data (e.g., a topic field) of a bitcoin transaction, according to some example embodiments.

Once the hash is confirmed by peer nodes of the blockchain (e.g., miners in a bitcoin blockchain), the transaction information will be viewable to any user via the blockchain, for example through a public blockchain user interface 225. As illustrated in the public blockchain user interface 225, the transaction has a transaction identifier ("txn"), a "to" or destination address which is the address of a smart contract on the blockchain, and a "from" address which is the public key of the blockchain client key pair. Further, the topic field includes the hash 215. To find the transaction, the transaction field can be input into the public blockchain user interface, which can return the data illustrated in FIG. 2, and the hash 215 generated from the signed document 205 can be compared to the hash stored in the transaction retrieved from the blockchain. If the hashes do not match, then the document used to generate that hash has been manipulated or doctored and is not the original document used in the signing process. On the other hand, if the hashes match then the user can be assured that the signed document 205 has not been modified, since such a modification would generate a different hash and not match what is stored in the public blockchain.

Figure 3:
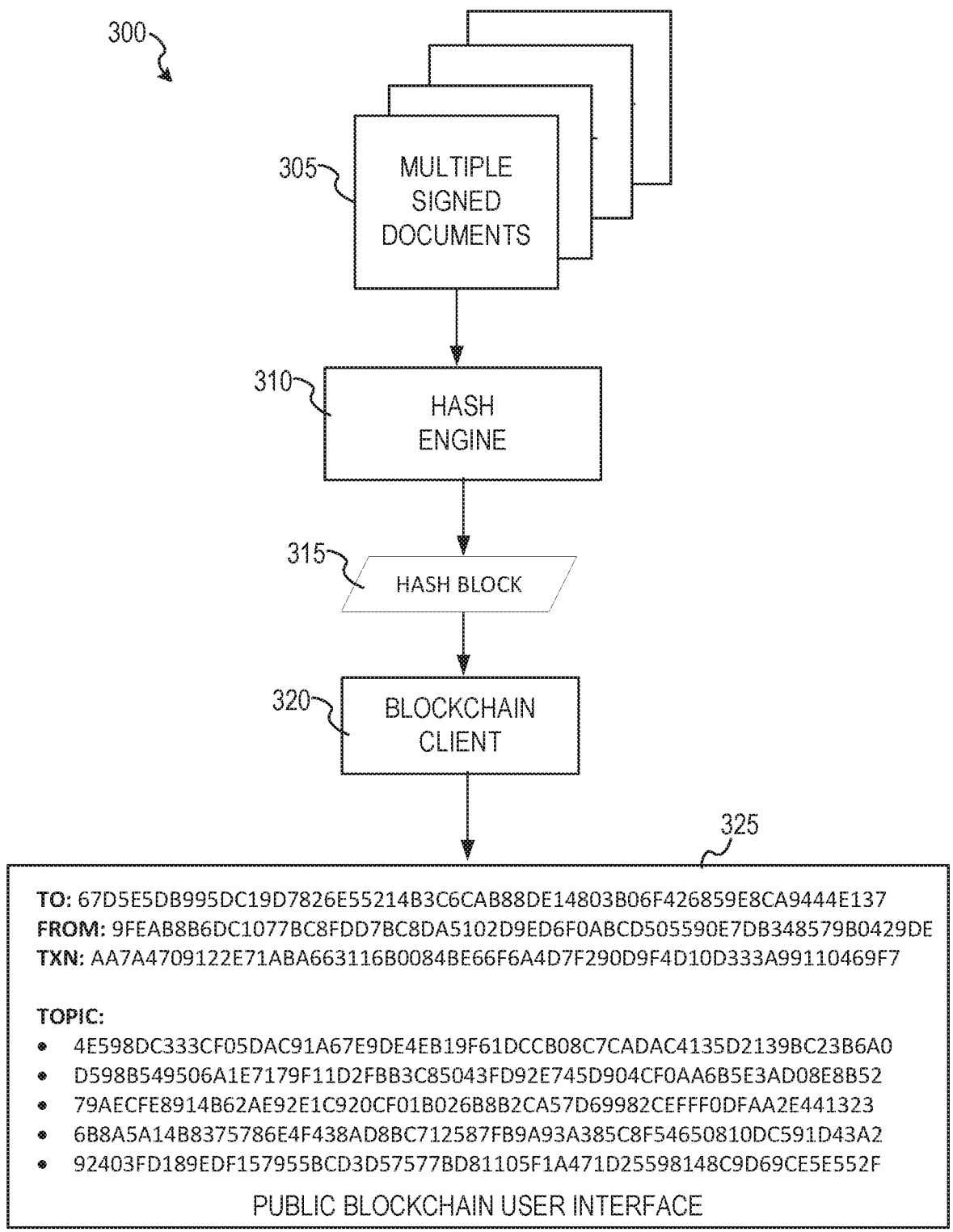
FIG. 3 shows an example dataflow block-based document validation using batched hashes, according to some example embodiments.

FIG. 3 shows an example dataflow 300 for blockchain document validation using batched hashes, according to some example embodiments. In some example embodiments, to save computational resources (e.g., network bandwidth, storage bandwidth, the gas price of interacting with the smart contract located at the storage or "to" address, etc.), multiple hashes generated from different signed documents are batched together for recording in a single transaction with the public blockchain. In particular, as illustrated in FIG. 3, multiple signed documents 305 can be input into the hash engine 310. The hash engine 310 generates an individual hash for each of the one of the multiple signed documents 305. Each of the individual hashes can be grouped together as a list in hash block 315. The blockchain client 320 then transmits the hash block 315 to the blockchain, as discussed above. For example, the blockchain client 320 generates a request to interact with a smart contract on the public blockchain that has the "to" address, as shown in public blockchain user interface 325. The payload or topic of the request to interact with a smart contract will include all of the hashes in the hash block 315. For example, as illustrated in public blockchain user interface 325, the topic or payload data of the recorded transaction includes five hashes from five different documents. Similar to the approach of FIG. 2, to validate any one of the multiple sign documents 305, a transaction having the transaction code is shown in public blockchain user interface 325 is retrieved from the public blockchain, and the retrieved payload data is compared to determine whether any of the hashes match the document being validated.

Figure 4:
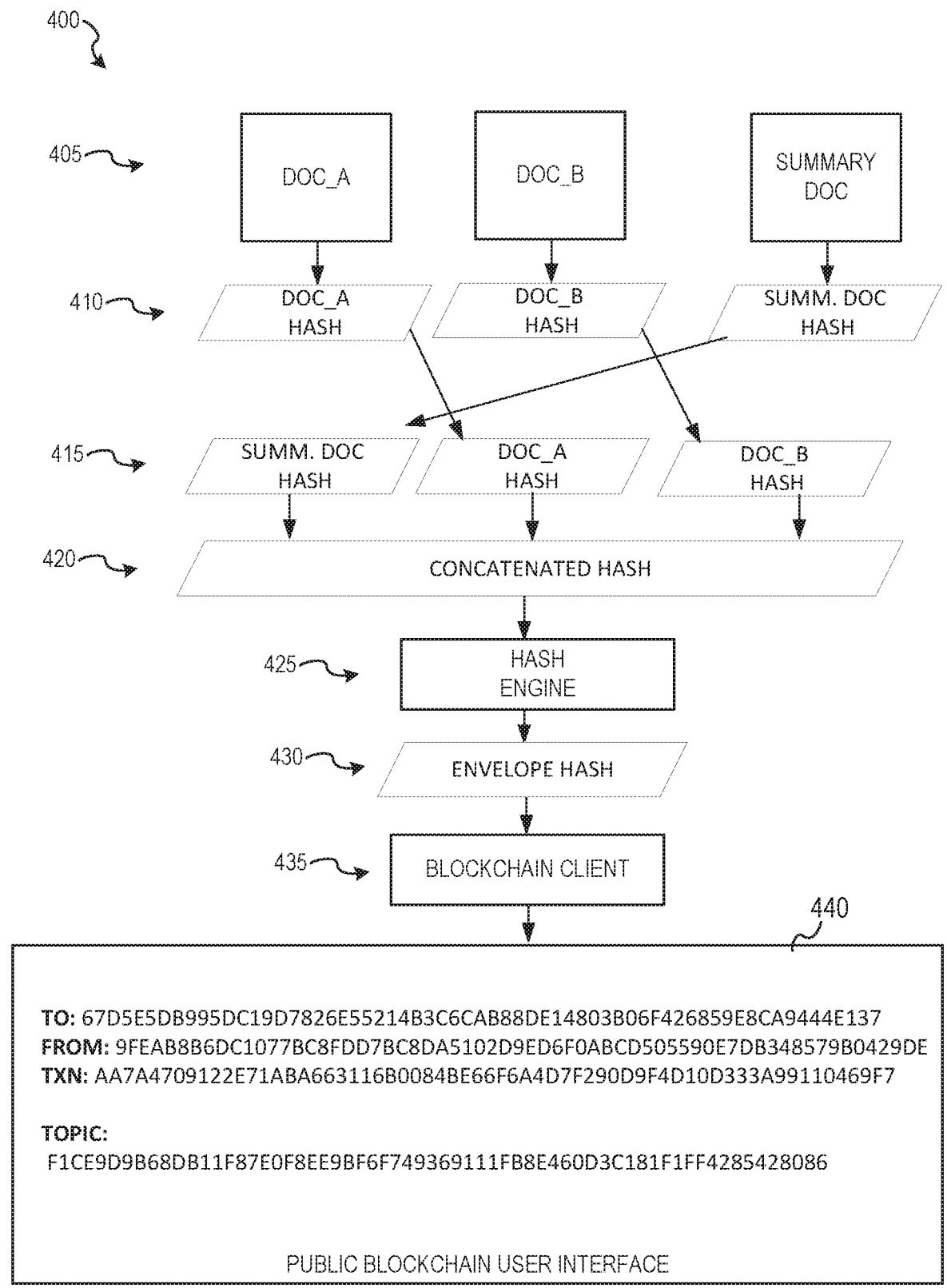
FIG. 4 shows an example dataflow architecture for block-based validation of multiple documents in a transaction envelope, according to some example embodiments.

FIG. 4 shows an example dataflow architecture 400 for blockchain validation of multiple documents in a transaction envelope, according to some example embodiments. As used herein, an envelope is a collection of documents that have to do with an agreement. For example, an agreement for database services might have several different documents that are related to each other and signed and kept together, for later reference. As such, the documents in the envelope may delineate the four corners of the agreement, though the terms of the agreement may be distributed across any or all of the documents in the envelope. To securely record an envelope for a complex agreement, each of the envelope documents 405 are used to generate hashes. For example document_A is used to generate document_A hash, document_B is used to generate document_B hash, and the summary document may be used to generate the summary document hash. In some example embodiments, document_A and document_B contain actual terms of the agreement, and the summary document includes summary information of the document signing process. For example, the summary document can include each of the filenames of documents in the envelope (e.g., document_A, and document_B), the signing users, timestamps indicating when each of the signing users signed, and so on.

In some example embodiments, the generated hashes 410 are sorted to generate the sorted hashes 415. For example, each of the hashes may be sorted in ascending or descending value based on their value. For example, the hashes can be converted from hexadecimal to binary form, then sorted from greatest to least based on their values.

The sorted hashes 415 are then merged by concatenating them together to generate the concatenated hash 420. The concatenated hash 420 is input into the hashing engine 425, which applies a hashing scheme, such as SHA256, to generate an envelope hash 430. In this way, even though a given envelope may contain a multitude of documents, which can result in a long concatenated hash 420, the hashing engine reduces the hash size for the entire envelope to the envelope hash 430, which is pre-set by the hashing scheme selected (e.g., 256 bits for SHA256).

Continuing, the blockchain client then transmits request to a blockchain object, as discussed above. For example, the blockchain client 435 can transmit a request to interact with a smart contract on the public blockchain via blockchain client 435 (which interfaces with miners, e.g., miner 130), where the request can include the hash 430. Once the transaction is in the blockchain, it will be accessible through a public blockchain user interface 440, as discussed above. To validate the envelope, a collection of documents can be assembled, a hash generated for each of the documents, and sorted via the pre-set sort order, and then concatenated to generate the concatenated hash. If any of the documents are not sorted correctly, the concatenated hash will be different, thus causing a different hash to be generated by 425. Thus, this approach allows the user seeking to validate the envelope documents to not only confirm which documents were in the envelope, but the fact that they were signed together, and further the signing process was conducted according to the summary document (this is because any change to the summary document would again cause a cascade of different hashes, which will yield in a different envelope hash, and likewise for changes/modifications to document_A and document_B).

Figure 5:
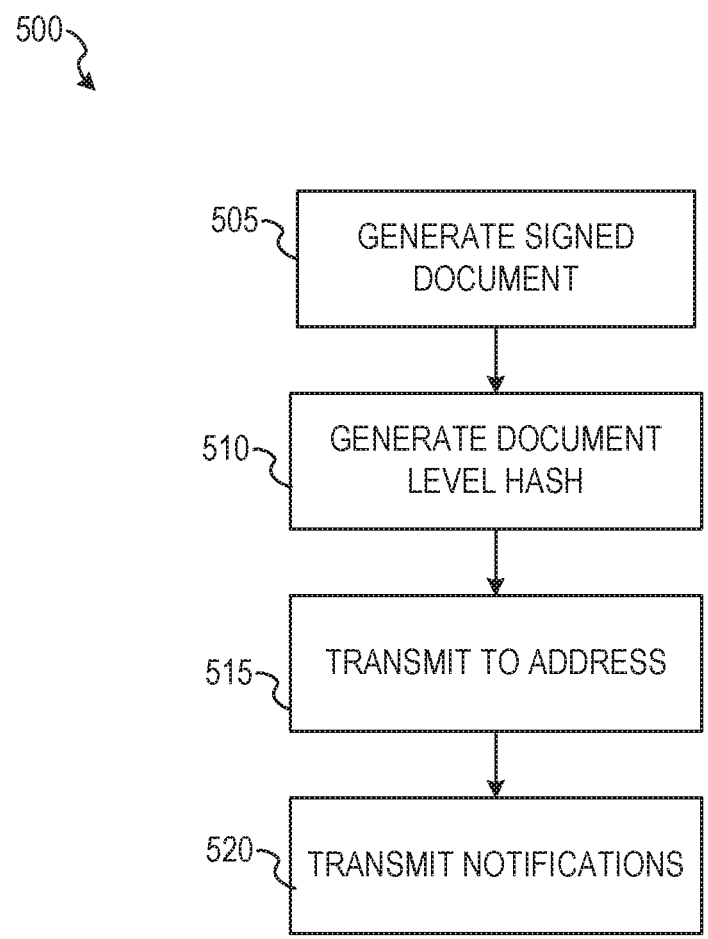
FIG. 5 shows an example flow diagram of a method for block-based validation electronically signed documents, according to some example embodiments.

FIG. 5 shows an example flow diagram of a method 500 for block-based validation electronically signed documents, according to some example embodiments. At operation 505, the validation system 150 generates a signed document. For example, at operation 505, the validation system 150 generates a PDF document comprising terms of agreement and one or more signatures (e.g., handwritten signatures, digital certificates). At operation 510, the validation system 150 generates a document level hash by applying a hash scheme to the signed document. At operation 515, the validation system 150 transmits a request to store a record in a public accessible blockchain (e.g., Bitcoin blockchain, Ethereum Blockchain). In some example embodiments, the request generated and transmitted at operation 515 is a request directed to an address of a smart contract that is stored and managed by the blockchain. The smart contract can be interacted with the miner nodes (e.g., miner 130, FIG. 1), which store the payload data of the request in the blockchain in a way that cannot later be changed. At operation 520, the validation system 150 transmits one or more notifications can be displayed on the client device. For example, the validation system 150 can display a user interface such as blockchain user interface 225 (FIG. 2).

Figure 6:
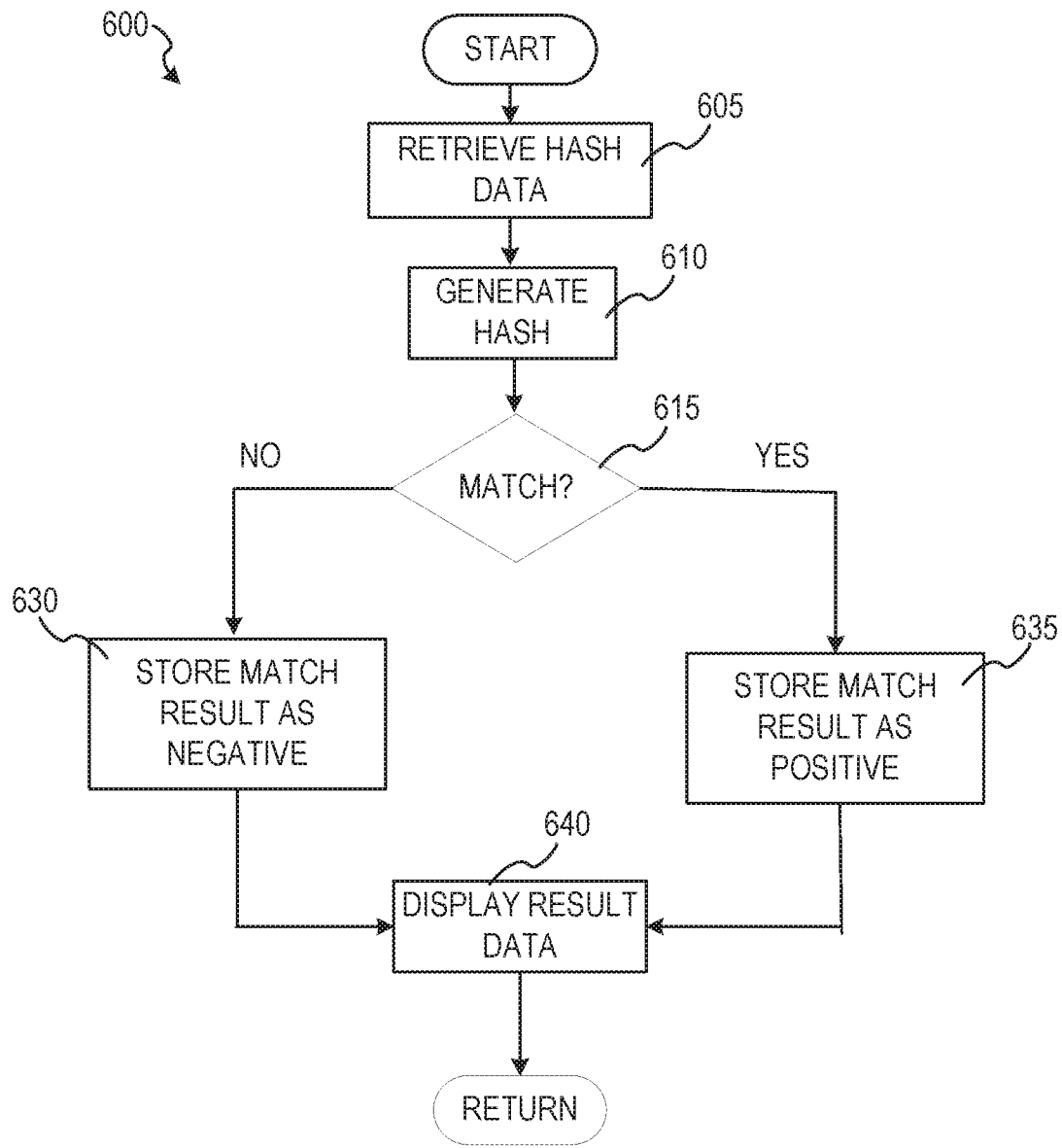
FIG. 6 shows a flow diagram of a method for validating a document using a block-based approach, according to some example embodiments.

FIG. 6 shows a flow diagram of a method 600 for validating a document using a block-based approach, according to some example embodiments. At operation 605, the validation system 150 retrieves hash data from a public blockchain. For example, a user can request that a specified document or set of documents be validated. In response to the request, a lookup is performed to determine the block in which the hash data for the transaction was stored. At operation 610, the validation system 150 generates a hash of a document to be validated. At operation 615, the generated hash is compared to the hash retrieved from the blockchain, to determine whether the exactly match. If the two hashes do not match, then at operation 630 validation system 150 stores the match result is negative. On the other hand, if the two hashes exactly match, then the validation system 150 stores the match result is positive at operation 635. At operation 640, the validation system 150 displays the result data as authentication data on the display device of the client device.

In some example embodiments, which block of the public blockchain stores a record of the document may not be known. That is, for example, a user may submit a document by file upload, with a request to determine whether the uploaded document was included in a transaction recorded via the validation system 150. In those example embodiments, the uploaded document is input into the hash engine, which generates a new hash. Then the new hash is used to perform a search in the public blockchain to determine whether the new hash is located anywhere in the public blockchain. In some example embodiments, the search is performed only within the payload data of the "to" or destination address of the smart contract. In some example embodiments, the database 126 stores a table of the destination addresses to which requests were previously sent, which can then be used to limit the search of the blockchain to only those smart contract addresses in the table.

Figure 7A:
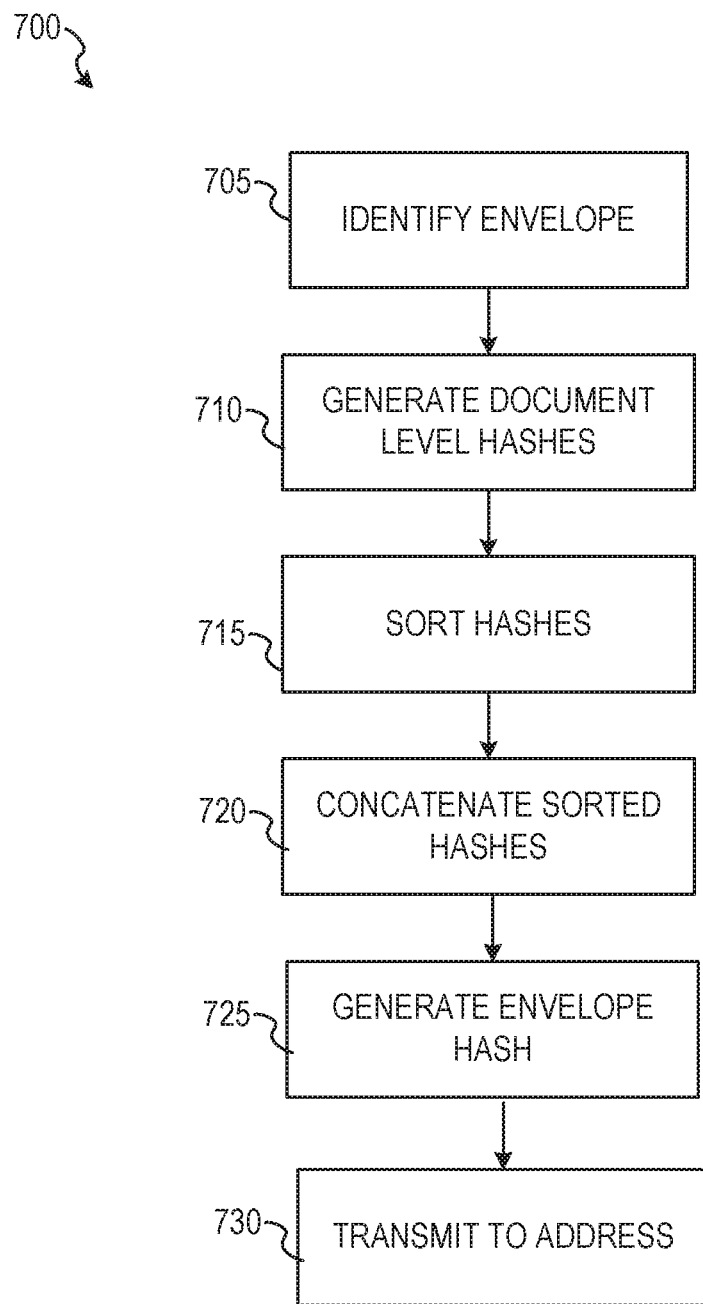
FIGS. 7A and 7B show a flow diagram and user interface for validating envelope of files, according to some example embodiments.

FIG. 7A shows a flow diagram of a method 700 for validating envelope of files using a block-based approach, according to some example embodiments. At operation 705, the validation system 150 identifies the envelope or directory of documents. At operation 710, the validation system 150 generates document level hashes for each of the documents. For example, as explained with reference to FIG. 4, the documents in the envelope can include one or more documents that form the part of the agreement, as well as a summary document that describes the signing process. At operation 715, the validation system 150 sorts the generated hashes. In some example embodiments, the sort order is a value stored in the summary document in the envelope. At operation 720, the validation system 150 concatenates the sorted addresses in the sorted order (e.g., ascending, descending). At operation 725, the validation system 150 applies a hashing scheme to the concatenated sorted hashes to generate an envelope hash. At operation 730, the validation system 150 transmits a request to interact with a smart contract located on public blockchain. The request can be received and processed by a miner 130 which securely stores the envelope hash on the blockchain.

Figure 7B:
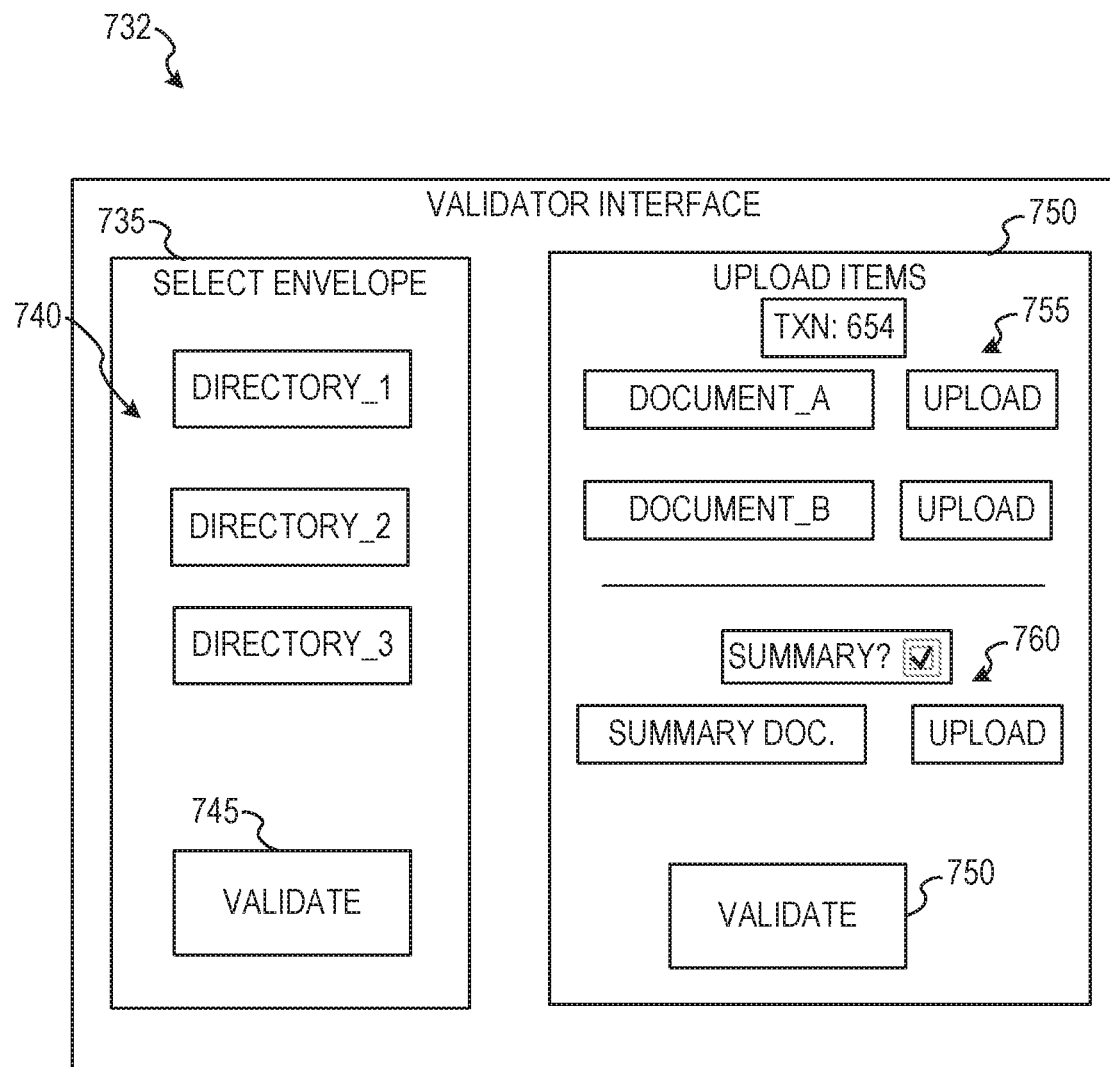

FIG. 7B shows an example validator user interface 732 for implementing block-based validation, according to some example embodiments. The validator user interface 732 is displayed on client device 110, e.g., in an Internet browser as a cloud software interface to validator system 150. It is appreciated that the validator user interface 732 can be implemented to the different embodiments discussed above, in addition to method 700 of FIG. 7A. As illustrated, the validator interface 732 comprises two example validation windows. In the first validation window 735 the user can select a directory stored in cloud storage (e.g., in database 126) where the directly includes one or more documents that are in a signed agreement. For example, "DIRECTORY_1" can include document_A, document_B, and a summary document as discussed above. Upon the user 106 selecting "DIRECTORY_1" the user 106 can select validate button 745 which hashes, orders the hashes in a default order, and merges the hashes, generates an envelope hash from the merged hashes, and then accesses the blockchain data to confirm that the contents of the selected directory were originally in the signed agreement or document set by comparing the envelope hash to the blockchain stored envelope hash.

Additionally, a user 106 can increase control over the validation process by individually selecting and uploading document data for upload. For example, using the second window 750 the user can upload individual documents that are supposed to be part of a document having a hash stored on the blockchain using the approaches discussed above. For example, the user 106 can individually upload individual documents using upload fields 755 and the validator system 150 can hash the uploaded documents, sort the hashes, merge the sorted hashes (e.g., via concatenation), and generate a final hash which is then compared to the value for the document set stored on the blockchain. In some example embodiments, the document set is identified via a blockchain transaction id ("TXN: 654") input by the user to identify the block.

Further, the user 106 can select to include a summary document using checkbox in summary window 760, according to some example embodiments. As discussed, the summary document can specify which documents were in the envelope or four corners of the agreement. In some example embodiments, the summary document specifies how the envelope hash is generated. For example, the system 150 may use a first sort order by default, such as ascending, and the summary document specifies that the envelope hash should generated using a different sort order, such as descending. In some example embodiments, if no summary document is utilized, then the hashes from the documents are sorted in a default value, thereby allowing any documents to be uploaded and sorted, then compared to the blockchain stored value to validate the documents.

Figure 8:
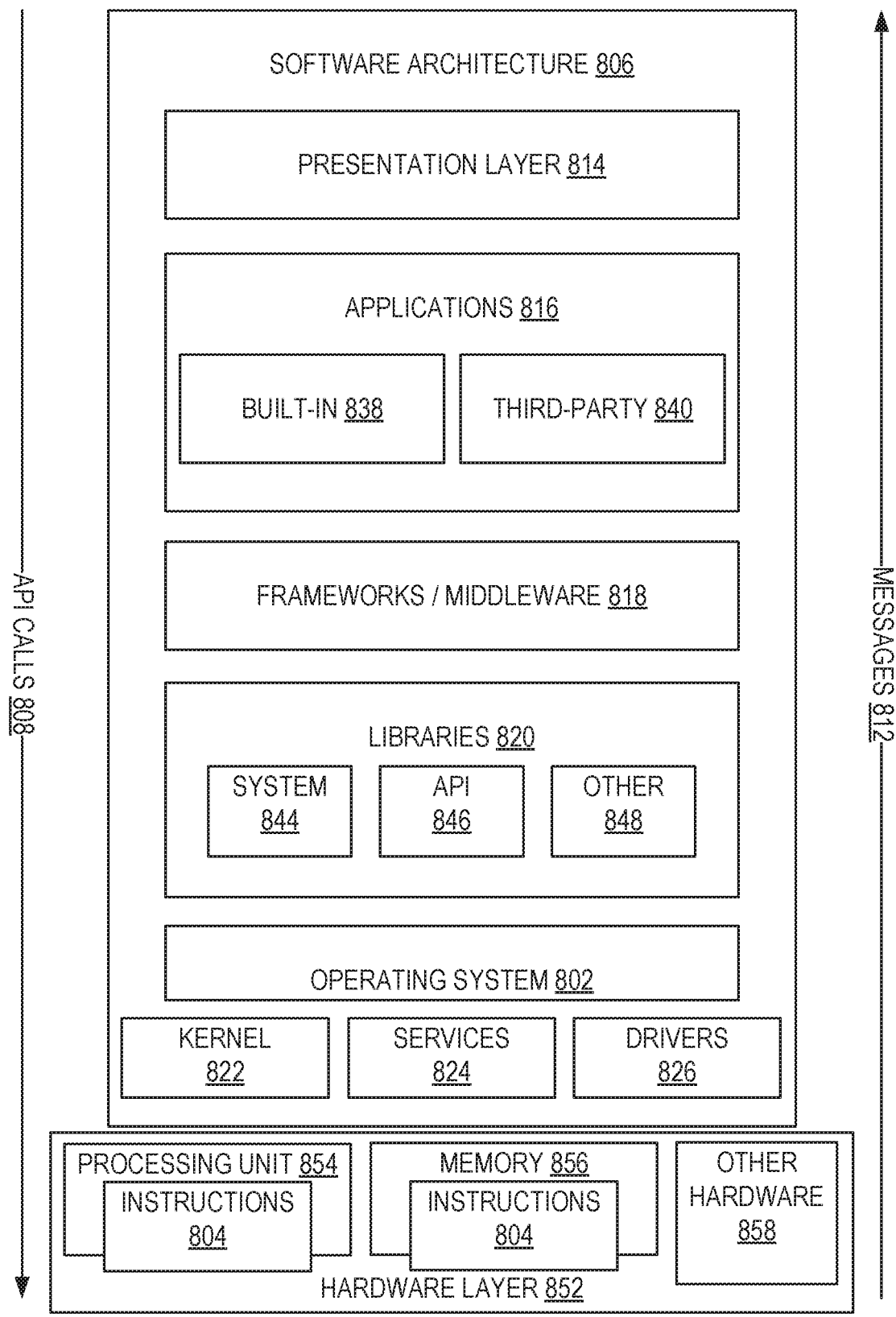
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture, and it will be appreciated that many other architectures may be implemented to facilitate the functionality described herein. The software architecture 806 may execute on hardware such as a machine 900 of FIG. 9 that includes, among other things, processors, memory, and I/O components. A representative hardware layer 852 is illustrated and can represent, for example, the machine 900 of FIG. 9. The representative hardware layer 852 includes a processing unit 854 having associated executable instructions 804. The executable instructions 804 represent the executable instructions of the software architecture 806, including implementation of the methods, components, and so forth described herein. The hardware layer 852 also includes a memory/storage 856, which also has the executable instructions 804. The hardware layer 852 may also comprise other hardware 858.

In the example architecture of FIG. 8, the software architecture 806 may be conceptualized as a stack of layers where each layer provides a particular functionality. For example, the software architecture 806 may include layers such as an operating system 802, libraries 820, frameworks/middle ware 818, applications 88, and a presentation layer 814. Operationally, the applications 88 and/or other components within the layers may invoke application programming interface (API) calls 808 through the software stack and receive a response in the form of messages 812. The layers illustrated are representative in nature and not all software architectures have all layers. For example, some mobile or special-purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 88 and/or other components and/or layers. The libraries 820 provide functionality that allows other software components to perform tasks in an easier fashion than by interfacing directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 88 and other software components/modules.

The frameworks/middleware 818 provide a higher-level common infrastructure that may be used by the applications 88 and/or other software components/modules. For example, the frameworks!middleware 818 may provide various graphic user interface (GUI) functions, high-level resource management, high-level location services, and so forth. The frameworks/middleware 818 may provide a broad spectrum of other APIs that may be utilized by the applications 888 and/or other software components/modules, some of which may be specific to a particular operating system 802 or platform.

The applications 88 include built-in applications 838 and/or third-party applications 840. Examples of representative built-in applications 838 may include, but are not limited to, a contacts application, a browser application, a hook reader application, a location application, a media application, a messaging application, and/or a game application. The third-party applications 840 may include an application developed using the ANDROID™ or IOS™ software development kit (SDK) by an entity other than the vendor of the platform and may be mobile software running on a mobile operating system such as IOS™, ANDROID™, WINDOWS® Phone, or other mobile operating systems. The third-party applications 840 may invoke the API calls 808 provided by the mobile operating system (such as the operating system 802) to facilitate functionality described herein.

The applications 88 may use built-in operating system functions (e.g., kernel 822, services 824, and/or drivers 826), libraries 820, and frame works/middleware 818 to create user interfaces to interact with users of the system. Alternatively, or additionally, in some systems, interactions with a user may occur through a presentation layer, such as the presentation layer 814. In these systems, the application/component "logic" can be separated from the aspects of the application/component that interact with a user.

Figure 9:
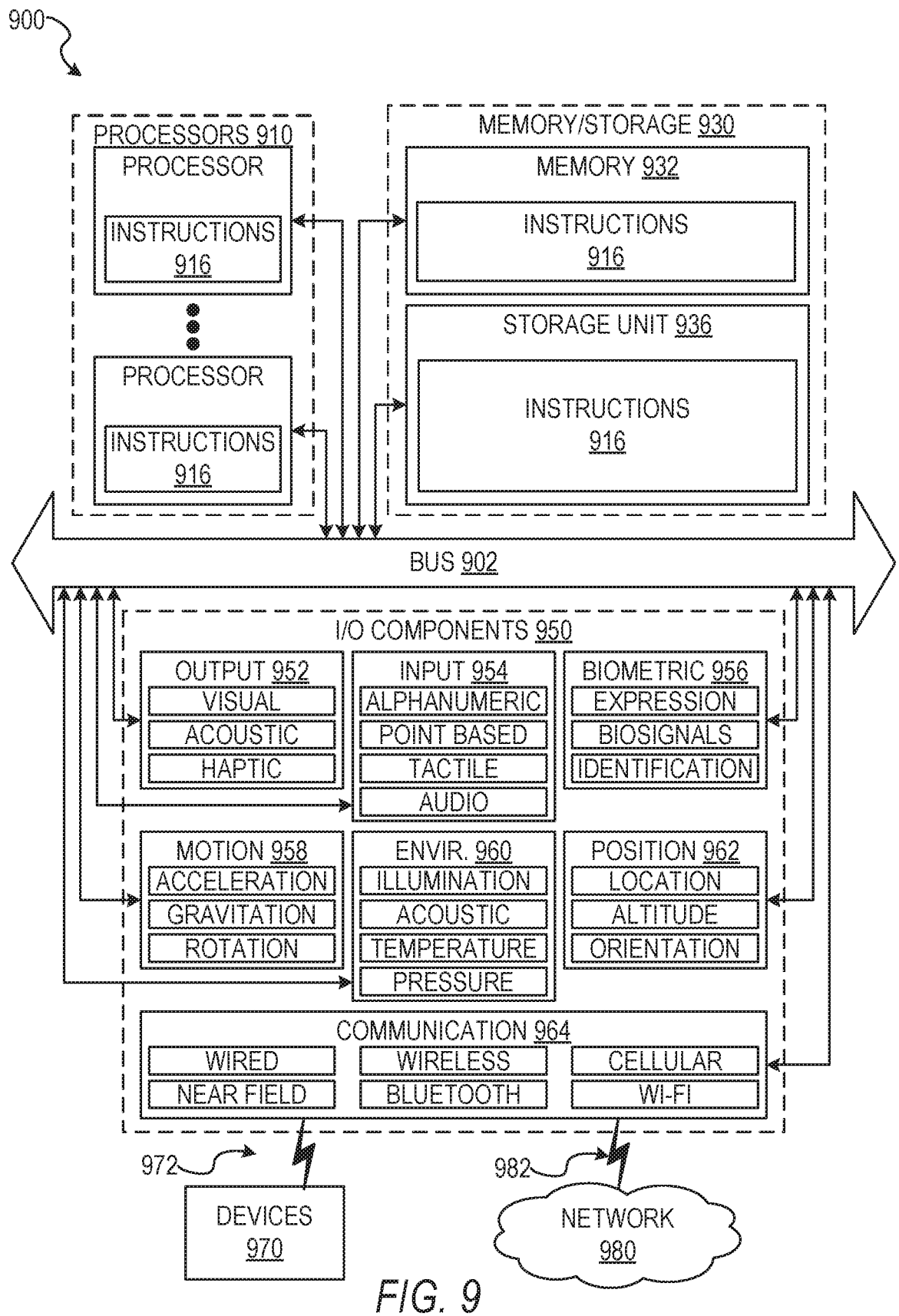
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 98 (e.g., software, a program, an application, an applet, an app, or other executable code) for causing the machine 900 to perform any one or more of the methodologies discussed herein may be executed. As such, the instructions 98 may be used to implement modules or components described herein. The instructions 98 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 98, sequentially or otherwise, that specify actions to be taken by the machine 900. Further, while only a single machine 900 is illustrated, the term "machine" shall also be taken to include a collection of machines that individually or jointly execute the instructions 98 to perform any one or more of the methodologies discussed herein.

The machine 900 may include processors 910, memory/storage 930, and I/O components 950, which may be configured to communicate with each other such as via a bus 902. The memory/storage 930 may include a memory 932, such as a main memory, or other memory storage, and a storage unit 936, both accessible to the processors 910 such as via the bus 902. The storage unit 936 and memory 932 store the instructions 98 embodying any one or more of the methodologies or functions described herein. The instructions 98 may also reside, completely or partially, within the memory 932, within the storage unit 936, within at least one of the processors 910 (e.g., within the processor's cache memory), or any suitable combination thereof, during execution thereof by the machine 900. Accordingly, the memory 932, the storage unit 936, and the memory of the processors 910 are examples of machine-readable media.

The I/O components 950 may include a wide variety of components to receive input, provide output, produce output, transmit information, exchange information, capture measurements, and so on. The specific I/O components 950 that are included in a particular machine 900 will depend on the type of machine. For example, portable machines such as mobile phones will likely include a touch input device or other such input mechanisms, while a headless server machine will likely not include such a touch input device. It will be appreciated that the I/O components 950 may include many other components that are not shown in. FIG. 9. The I/O components 950 are grouped according to functionality merely for simplifying the following discussion and the grouping is in no way limiting. In various example embodiments, the I/O components 950 may include output components 952 and input components 954. The output components 952 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 950 may include biometric components 956, motion components 958, environment components 960, or position components 962 among a wide array of other components. For example, the biometric components 956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 958 may include acceleration sensor components (e.g., accelerometer), gravitation sensor components, rotation sensor components (e.g., gyroscope), and so forth. The environment components 960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 950 may include communication components 964 operable to couple the machine 900 to a network 980 or devices 970 via a coupling 982 and a coupling 972 respectively. For example, the communication components 964 may include a network interface component or other suitable device to interface with the network 980. In further examples, the communication components 964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 970 may be another machine or any of a wide variety of peripheral devices (e.g., a peripheral device coupled via a Universal Serial Bus (USB)).

Moreover, the communication components 964 may detect identifiers or include components operable to detect identifiers. For example, the communication components 964 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF49, Ultra Code, UCC RSS-2D barcode, and other optical codes), or acoustic detection components (e.g., microphones to identify tagged audio signals). In addition, a variety of information may be derived via the communication components 964, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions 98 for execution by the machine 900, and includes digital or analog communications signals or other intangible media to facilitate communication of such instructions 98. Instructions 98 may be transmitted or received over the network 980 using a transmission medium via a network interface device and using any one of a number of well-known transfer protocols.

"CLIENT DEVICE" in this context refers to any machine 900 that interfaces to a communications network 980 to obtain resources from one or more server systems or other client devices. A client device 19 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 980.

"COMMUNICATIONS NETWORK" in this context refers to one or more portions of a network 980 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 980 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 98 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 98. The term "machine-readable medium" shall also be taken to include any medium, or combination of multiple media, that is capable of storing instructions 98 (e.g., code) for execution by a machine 900, such that the instructions 98, when executed by one or more processors 910 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 912 or a group of processors 910) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 900) uniquely tailored to perform the configured functions and are no longer general-purpose processors 910. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 912 configured by software to become a special-purpose processor, the general-purpose processor 912 may be configured as respectively different special-purpose processors (e.g., comprising different hardware components) at different times. Software accordingly configures a particular processor 912 or processors 910, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 910 that are temporarily configured (e.g., by software) or permanently configured to perform the relevant operations. Whether temporarily or permanently configured, such processors 910 may constitute processor-implemented components that operate to perform one or more operations or functions described herein. As used herein, "processor-implemented component" refers to a hardware component implemented using one or more processors 910. Similarly, the methods described herein may be at least partially processor-implemented, with a particular processor 912 or processors 910 being an example of hardware. For example, at least some of the operations of a method may be performed by one or more processors 910 or processor-implemented components. Moreover, the one or more processors 910 may also operate to support performance of the relevant operations in a "cloud computing" environment or as a "software as a service" (SaaS). For example, at least some of the operations may be performed by a group of computers (as examples of machines 900 including processors 910), with these operations being accessible via a network 980 (e.g., the Internet) and via one or more appropriate interfaces (e.g., an API). The performance of certain of the operations may be distributed among the processors 910, not only residing within a single machine 900, but deployed across a number of machines 900. In some example embodiments, the processors 910 or processor-implemented components may be located in a single geographic location (e.g., within a home environment, an office environment, or a server farm). In other example embodiments, the processors 910 or processor-implemented components may be distributed across a number of geographic locations.

"PROCESSOR" in this context refers to any circuit or virtual circuit (a physical circuit emulated by logic executing on an actual processor 912) that manipulates data values according to control signals (e.g., "commands", "op codes", "machine code", etc.) and which produces corresponding output signals that are applied to operate a machine 900. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (MC), or any combination thereof. A processor 910 may further be a multi-core processor 910 having two or more independent processors 912, 914 (sometimes referred to as "cores") that may execute instructions 98 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
generating a plurality of document hashes by generating a document hash for each file in an envelope, the envelope comprising two or more electronically signed documents having signature tabs in association with different topics;
generating an envelope hash of the plurality of document hashes;
transmitting, to a storage address of a network blockchain, a request that comprises the envelope hash as payload data;
receiving a validation request from a client device, the validation request specifying an electronically signed document of the envelope;
generating a new envelope hash by hashing the envelope containing the specified electronically signed document;
retrieving the payload data from the storage address on the network blockchain;
confirming that the specified electronically signed document of the envelope is one of the one or more electronically signed documents based on the new envelope hash matching the one or more hashes in the payload data; and
responsive to confirming that the specified electronically signed document of the envelope matches the one or more hashes in the payload data, transmitting a notification of validation to the client device.

2. The method of claim 1, wherein the two or more electronically signed documents are a collection of files of an agreement between at least two users of a network service.

3. The method of claim 2, wherein generating the envelope hash comprises:
sorting the plurality of document hashes in a sort order; and
merging the plurality of document hashes in the sort order.

4. The method of claim 3, wherein the plurality of document hashes is merged by concatenation.

5. The method of claim 3, wherein the sort order ranks the plurality of document hashes in ascending order.

6. The method of claim 1, wherein the two or more electronically signed documents comprise a first signed document for an agreement between a set of user profiles of a network service, and a second signed document for a different agreement between a different set of user profiles of the network service.

7. The method of claim 6, wherein the plurality of document hashes comprise a first tracking hash generated from the first signed document, and a second tracking hash generated from the second signed document.

8. The method of claim 7, wherein the payload data is a batch of hashes including the first document hash and the second document hash.

9. The method of claim 1, wherein the storage address is a receive address of a smart contract on the network blockchain.

10. The method of claim 1 wherein the envelope further comprises a summary document with no signature tab.

11. A system comprising:
one or more processors of a client device; and
a memory storing instructions that, when executed by the one or more processors, cause the system to perform operations comprising:
generating a plurality of document hashes by generating a document hash for each file in an envelope, the envelope comprising two or more electronically signed documents having signature tabs in association with different topics;
generating an envelope hash of the plurality of document hashes;
transmitting, to a storage address of a network blockchain, a request that comprises the envelope hash as payload data;
receiving a validation request from a client device, the validation request specifying an electronically signed document of the envelope;
generating a new envelope hash by hashing the envelope containing the specified electronically signed document;
retrieving the payload data from the storage address on the network blockchain;
confirming that the specified electronically signed document of the envelope is one of the one or more electronically signed documents based on the new envelope hash matching the one or more hashes in the payload data; and
responsive to confirming that the specified electronically signed document of the envelope matches the one or more hashes in the payload data, transmitting a notification of validation to the client device.

12. The system of claim 11, wherein the two or more electronically signed documents are a collection of files of an agreement between at least two user profiles of a network service.

13. The system of claim 12, wherein generating the envelope hash comprises:
sorting the plurality of document hashes in a sort order; and
merging the plurality of document hashes in the sort order.

14. The system of claim 13, wherein the plurality of document hashes is merged by concatenation.

15. The system of claim 11, wherein the sort order ranks the plurality of document hashes in ascending or descending order.

16. The system of claim 11, wherein the two or more electronically signed documents comprise a first signed document for an agreement between a set of user profiles of a network service, and a second signed document for a different agreement between a different set of user profiles of the network service.

17. The system of claim 16, wherein the plurality of document hashes comprise a first tracking hash generated from the first signed document, and a second tracking hash generated from the second signed document.

18. The method of claim 11 wherein the envelope further comprises a summary document with no signature tab.

19. A machine-readable storage device embodying instructions that, when executed by a processor, cause the processor to perform operations comprising:
  generating a plurality of document hashes by generating a document hash for each file in an envelope, the envelope comprising two or more electronically signed documents having signature tabs in association with different topics;
  generating an envelope hash of the plurality of document hashes;
  transmitting, to a storage address of a network blockchain, a request that comprises the envelope hash as payload data;
  receiving a validation request from a client device, the validation request specifying an electronically signed document of the envelope;
  generating a new envelope hash by hashing the envelope containing the specified electronically signed document;
  retrieving the payload data from the storage address on the network blockchain;
  confirming that the specified electronically signed document of the envelope is one of the one or more electronically signed documents based on the new envelope hash matching the one or more hashes in the payload data; and
  responsive to confirming that the specified electronically signed document of the envelope matches the one or more hashes in the payload data, transmitting a notification of validation to the client device.

* * * * *